United States Patent
Yang et al.

(10) Patent No.: US 9,026,241 B2
(45) Date of Patent: May 5, 2015

(54) CLOSED LOOP CONTROL FOR RELIABILITY

(75) Inventors: Wen-Cheng Yang, Hsinchu (TW); Chung-En Kao, Toufen Township (TW); You-Hua Chou, Taipei (TW); Ming-Chih Tsai, Hsinchu (TW); Chen-Chia Chiang, Zhunan Township (TW); Bo-Hung Lin, Kaohsiung (TW); Chin-Hsiang Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 513 days.

(21) Appl. No.: 13/404,676

(22) Filed: Feb. 24, 2012

(65) Prior Publication Data
US 2013/0226327 A1    Aug. 29, 2013

(51) Int. Cl.
G06F 19/00 (2011.01)
G05B 9/03 (2006.01)

(52) U.S. Cl.
CPC .......... G05B 9/03 (2013.01); *G05B 2219/45031* (2013.01)

(58) Field of Classification Search
CPC ........... G05B 2219/37533; G05B 9/03; G05B 23/0237; G05B 2219/45031
USPC ........................................ 700/108, 121, 182
See application file for complete search history.

(56) References Cited

U.S. PATENT DOCUMENTS

| | | | |
|---|---|---|---|
| 6,417,701 B1* | 7/2002 | Bolda | 327/79 |
| 6,496,749 B1* | 12/2002 | Yamaguchi et al. | 700/121 |
| 6,567,709 B1* | 5/2003 | Malm et al. | 700/21 |
| 6,895,293 B2* | 5/2005 | Reiss et al. | 700/110 |
| 7,328,130 B2* | 2/2008 | Wiles et al. | 702/183 |
| 2002/0055801 A1* | 5/2002 | Reiss et al. | 700/111 |
| 2002/0151987 A1* | 10/2002 | Mendez | 700/8 |
| 2007/0010170 A1* | 1/2007 | Chandrasekaran | 451/9 |
| 2007/0203481 A1* | 8/2007 | Gregg et al. | 606/34 |

* cited by examiner

*Primary Examiner* — Michael D Masinick
(74) *Attorney, Agent, or Firm* — Eschweiler & Associates, LLC

(57) ABSTRACT

The present disclosure relates to semiconductor tool monitoring system having multiple sensors configured to concurrently and independently monitor processing conditions of a semiconductor manufacturing tool. In some embodiments, the disclosed tool monitoring system comprises a first sensor system configured to monitor one or more processing conditions of a semiconductor manufacturing tool and to generate a first monitoring response based thereupon. A redundant, second sensor system is configured to concurrently monitor the one or more processing conditions of the manufacturing tool and to generate a second monitoring response based thereupon. A comparison element is configured to compare the first and second monitoring responses, and if the responses deviate from one another (e.g., have a deviation greater than a threshold value) to generate a warning signal. By comparing the first and second monitoring responses, errors in the sensor systems can be detected in real time, thereby preventing yield loss.

16 Claims, 4 Drawing Sheets

CLOSED LOOP CONTROL FOR RELIABILITY

BACKGROUND

Over the past three decades, the semiconductor manufacturing industry has continually decreased the size of semiconductor devices to achieve improved integrated chip performance. Modern day semiconductor manufacturing processes are able to achieve integrated chips having minimum features sizes that are on the order of tens of nanometers (e.g., gate sizes of about 10-20 nm). As minimum feature sizes have decreased, the manufacturing processes used to make integrated chips has become more complex and challenging to implement.

DETAILED DESCRIPTION

Figure 1:
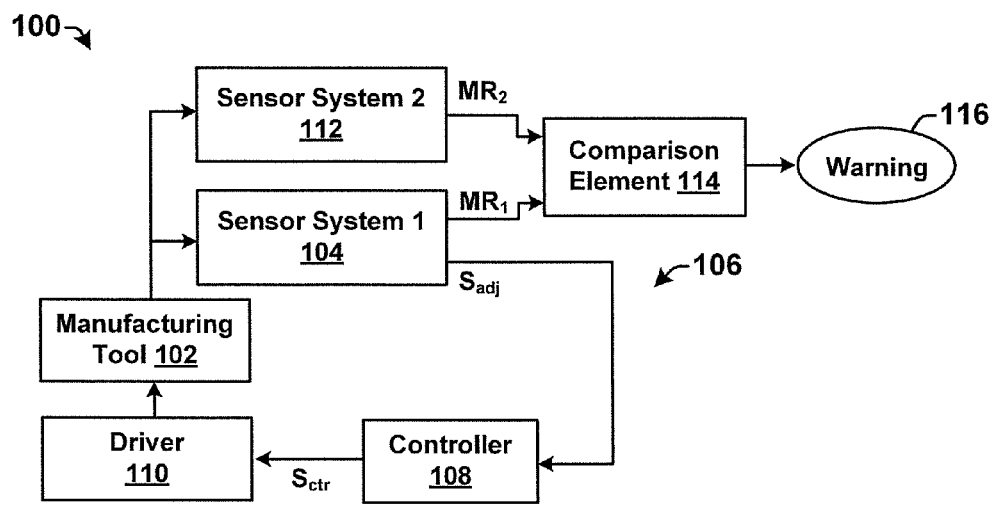
FIG. 1 illustrates a block diagram of some embodiments of a semiconductor manufacturing tool monitoring system, as provided herein.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

To form integrated chips having small minimum features sizes it is increasingly important to tightly control processing conditions within a semiconductor manufacturing line. In recent years, fault detection and classification (FDC) systems have become common place tools used in controlling processing conditions of semiconductor manufacturing tools. FDC systems are computer based systems that monitor one or more aspects of a semiconductor manufacturing tool and then analyze the monitored aspects to determine if the tool is operating within an acceptable performance range. To do this, FDC systems detect faults, classify the cause of the faults, and take an action to correct the faults.

While FDC systems are able to accurately monitor data obtained from a sensor system, they are not able to detect errors in the sensor system's operation. For example, if a sensor output shifts away from an actual measured value within a manufacturing tool (e.g., due to a hardware or reading error), the shift cannot be detected by the FDC system. Rather, it can only be detected by calibrating the sensor. However, if a calibration is not performed quickly after a fault arises, quality issues may occur in a large number of integrated chips passing through a tool.

Accordingly, some aspects of the present disclosure provide for a semiconductor tool monitoring system having multiple sensors configured to monitor processing conditions of a semiconductor manufacturing tool in real time. In some embodiments, the disclosed tool monitoring system comprises a first sensor system configured to monitor one or more processing conditions of a semiconductor manufacturing tool and to generate a first monitoring response based thereupon. A redundant, second sensor system is configured to concurrently monitor the one or more processing conditions of the manufacturing tool and to generate a second monitoring response based thereupon. A comparison element is configured to compare the first and second monitoring responses, and if the responses deviate from one another (e.g., have a deviation greater than a threshold value) to generate a warning signal. By comparing the first and second monitoring responses, errors in the sensor systems can be detected in real time, thereby preventing yield loss.

FIG. 1 illustrates a block diagram of some embodiments of a semiconductor tool monitoring system 100, as provided herein.

The semiconductor tool monitoring system 100 comprises a semiconductor manufacturing tool 102 configured to operate on a semiconductor body. In various embodiments, the manufacturing tool 102 may comprise any manufacturing tool in a semiconductor manufacturing line, such as an etching system, a deposition system, a lithography system, etc.

A first sensor system 104 is configured to measure one or more processing conditions of the manufacturing tool 102. Based upon the measured processing conditions, the first sensor system 104 generates an adjustment call $S_{adj}$. The adjustment call $S_{adj}$ is output to a closed control loop 106, which is configured to selectively act to keep actual processing conditions of the manufacturing tool 102 within an acceptable performance range. In some embodiments, the closed control loop 106 comprises a controller 108 and a driver 110. The controller 108 is configured to receive the adjustment call $S_{adj}$. If the one or more processing conditions fall outside of an acceptable performance range, the controller 108 is configured to generate a control signal $S_{ctr}$ based upon the adjustment call $S_{adj}$. The control signal $S_{ctr}$ is output from the controller 108 to the driver 110, which is configured to make adjustments to the one or more processing conditions of the manufacturing tool 102 until they fall within the acceptable performance range.

The first sensor system 104 is further configured to generate a first monitoring response $MR_1$ based upon the one or more measured processing conditions. The first monitoring response $MR_1$ corresponds to the one or more measured processing conditions. For example, in some embodiments, the first sensor system 104 may generate a first monitoring response $MR_1$ corresponding to one or more processing conditions comprising temperature, RF/DC power, or gas/chemical flow rates.

A redundant, second sensor system 112 is also configured to independently measure the one or more processing conditions within the manufacturing tool 102 and to generate a second monitoring response $MR_2$ therefrom, which corresponds to the one or more processing conditions. The first and second monitoring responses, $MR_1$ and $MR_2$, are provided to a comparison element 114 configured to compare the first and second monitoring responses. If the monitoring responses deviate from one another (e.g., by more than a predetermined value) the comparison element generates a warning signal 116. By comparing the first monitoring response $MR_1$ to the second monitoring response $MR_2$, the comparison element 114 can detect deviations between the monitoring responses. Since the first and second monitoring responses correspond to the same one or more processing conditions, deviations between the monitoring responses indicate an error in one or more components of the first or second sensor systems, 104 or 112.

The comparison element 114 may be comprise any element configured to perform a comparison of the first and second monitoring responses. For example, in some embodiments, the comparison element 114 comprises a logic element separate from the first and second sensor system. In other embodiments, the comparison element 114 is comprised within the second sensor system 112. In such an embodiment, the second sensor system 112 is further configured to receive the first monitoring response $MR_1$ from the first sensor system 104 and to compare the first monitoring response $MR_1$ to the second monitoring response $MR_2$. In yet other embodiments, the comparison element 114 comprises one or more FDCs configured to receive the first and second monitoring responses and to detect deviations therebetween.

Accordingly, semiconductor tool monitoring system 100 utilizes a redundant, second sensor system 112 to provide real time monitoring of the operation of the first sensor system 104 to detect shifts in the sensor system output (e.g., caused by a hardware or reading error) away from an actual measured value within a manufacturing tool 102. By monitoring operation of the first sensor system 104 in real time, integrated chip damage is reduced and reliability is enhanced by the tool monitoring system 100.

Figure 2:
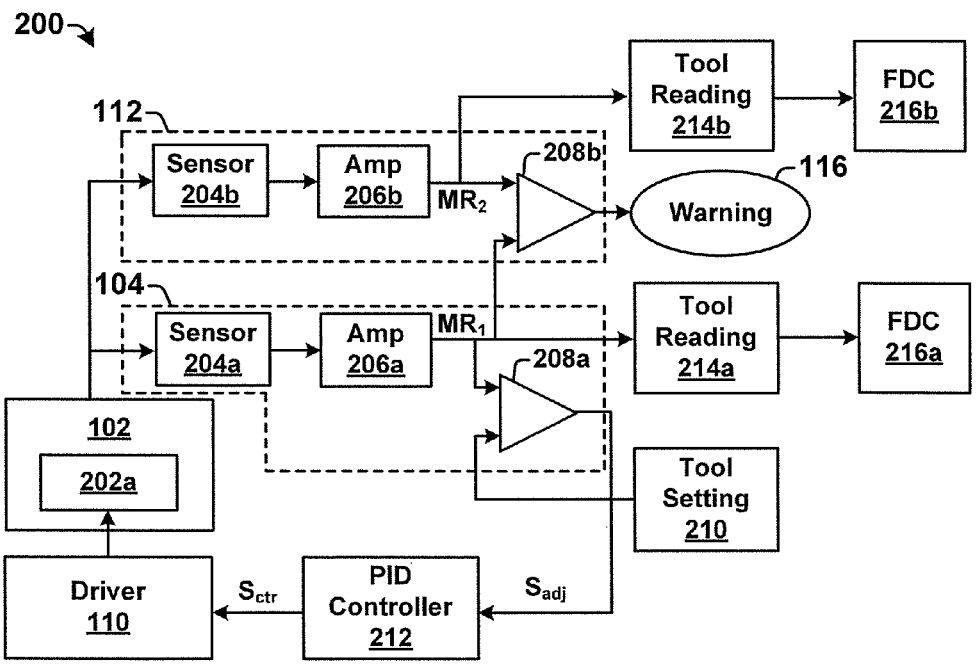
FIG. 2 illustrates a more detailed block diagram of some embodiments of a semiconductor manufacturing tool monitoring system, as provided herein.

FIG. 2 illustrates a block diagram of some more detailed embodiments of a semiconductor tool monitoring system 200, comprising a first sensor system 104 and a redundant, second sensor system 112.

The first and second sensor systems, 104 and 112, are in direct communication with a manufacturing tool 102 configured to operate on a semiconductor body. The manufacturing tool 102 comprises one or more manufacturing tool components 202 that are operable to adjust processing conditions of the manufacturing tool 102. In various embodiments, the manufacturing tool components 202 may comprise an RF/DC Power source, a heating element, or a mass flow controller (MFC) valve, for example.

The first sensor system 104 comprises a first sensor 204a configured to measure one or more processing conditions of manufacturing tool 102. The first sensor 204a generates a first output signal, corresponding to the measured processing condition. The first output signal is provided to a first amplifier 206a configured to generate a first monitoring response $MR_1$. The first monitoring response $MR_1$ is provided to a first comparator 208a.

A tool setting element 210 is configured to provide a tool setting value to the first comparator 208a. The tool setting element 210 may comprise a memory element configured to store data corresponding to one or more tool setting values that define an acceptable performance range of the manufacturing tool 102. The tool setting value may be set by a user to a specified value. In some embodiments, a fault detection and classification (FDC) system 216a is configured to vary the tool setting value based upon sensor data output from the first sensor 204a.

The first comparator 208a compares the first monitoring response $MR_1$ to the tool setting value. Based upon the comparison, the comparator 208a selectively generates an adjustment call $S_{adj}$ if the first monitoring response $MR_1$ violates the tool setting value (e.g., is greater than the tool setting value, is not within a range defined by the tool setting value).

The adjustment call $S_{adj}$ is provided to a closed control loop, comprising a proportional-integral-derivative (PID) controller 212 and a driver 110. The closed control loop is configured to adjust operation of one or more manufacturing tool components 202 based upon the adjustment call $S_{adj}$ until the processing conditions (e.g., temperature, RF/DC power, gas/chemical flow) of the manufacturing tool 102 match the tool setting value.

For example, in some embodiments wherein the manufacturing tool 102 comprises a plasma etching system, the processing condition may comprise the etch rate. If the first sensor 204a detects an etch rate that is outside of an acceptable rate, the comparator 208a will generate an adjustment call $S_{adj}$ that is provided to the PID controller 212 and which causes the PID controller 212 to operate the driver 110 to adjust a MFC valve to change the gas flow rate to the plasma etching system (e.g., to increase the etch rate). If the first sensor 204a detects an etch rate that is within an acceptable range, it does not generate an adjustment call $S_{adj}$ and operation of the plasma etching system remains unchanged.

The redundant, second sensor system 112 comprises a second sensor 204b configured to concurrently and independently measure the one or more processing conditions of manufacturing tool 102. The second sensor 204b generates a second output signal, corresponding to the measured processing condition, which is provided to a second amplifier 206b configured to generate second monitoring response $MR_2$. The second monitoring response $MR_2$ is provided to a second comparator 208b. The second comparator 208b is configured to compare the first monitoring response $MR_1$ to the second monitoring response $MR_2$ and to generate a warning signal 116 when the first and second monitoring responses deviate from one another by more than a threshold value. For example, in some embodiments, if the first monitoring response $MR_1$ and second monitoring response $MR_2$ correspond to different etching rates a warning signal is generated to indicate that one of the sensor systems, 104 or 112, is not operating properly.

In some embodiments, the threshold value is equal to zero, such that the second sensor system is configured to generate a warning signal if the first and second monitoring responses are unequal. In some embodiments, the warning signal 116 is provided to a graphical user interface (GUI) (e.g., a computer monitor), such that a user operating the manufacturing tool 102 is provided with notice of the error in the sensor systems. In other embodiments, the warning signal 116 is provided to control system (e.g., a processing unit) configured to suspend operation of the manufacturing tool 102 upon receiving the warning signal 116.

In some embodiments, the first and second monitoring responses, $MR_1$ and $MR_2$, may also be provided to first and second tool reading element, 214a and 214b, respectively. The first and second tool reading elements 214a and 214b are configured to translate the first and second monitoring responses, $MR_1$ and $MR_2$, to a data format readable by FDC systems 216a and 216b. In some embodiments, FDC system 216a comprises first tool reading element 214a and FDC system 216b comprises second tool reading element 214b. FDC system 216a is configured to analyze the first monitoring response $MR_1$ and to detect, classify, and correct any faults in the manufacturing tool 102. In some embodiments, the second monitoring response $MR_2$ analyzed by the FDC system 216b can be compared first monitoring response $MR_1$ analyzed by the FDC system 216a. If the monitoring responses deviate from one another, FDC systems 216a and/or 216b can take action to prevent damage to semiconductor bodies within the manufacturing tool 102. In some embodiments, the FDC system 216a and FDC system 216b comprise a single FDC system.

It will be appreciated that while the first sensor system 104 and the second sensor system 112 may comprise identical sensor systems in some embodiments, that the disclosed tool monitoring system is not limited to such embodiments. Rather, the first sensor system 104 and the second sensor system 112 may comprise different sensor systems, so long as the second sensor system 112 is of sufficient quality to provide a level of sensing that provides for a desired level of reliability.

Figure 3A:
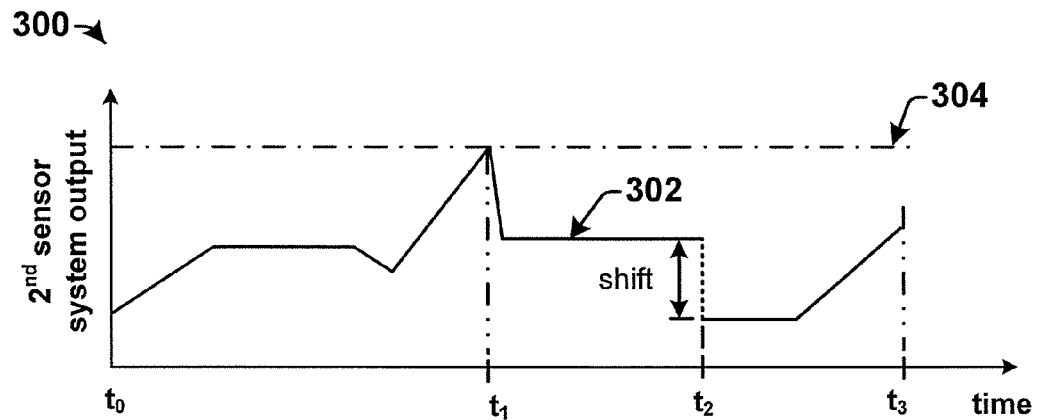
FIGS. 3a-3c illustrate graphs showing some embodiments of a disclosed semiconductor manufacturing tool monitoring system operation.
Figure 3B:
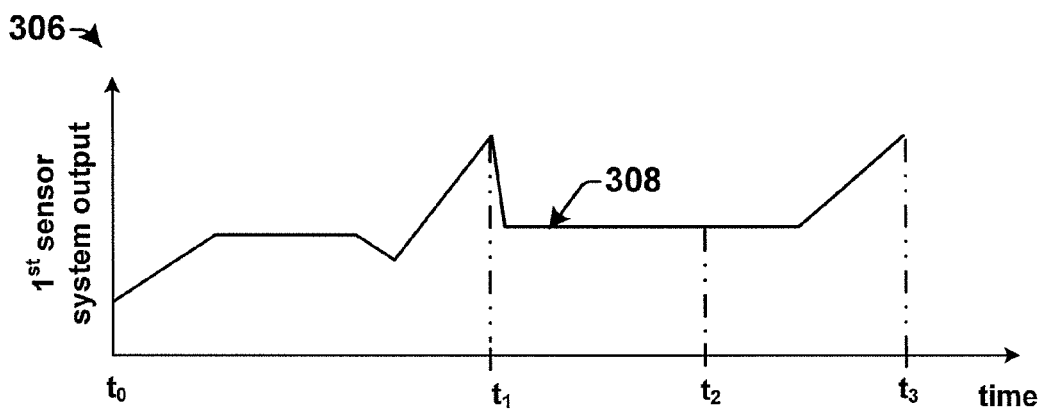
Figure 3C:
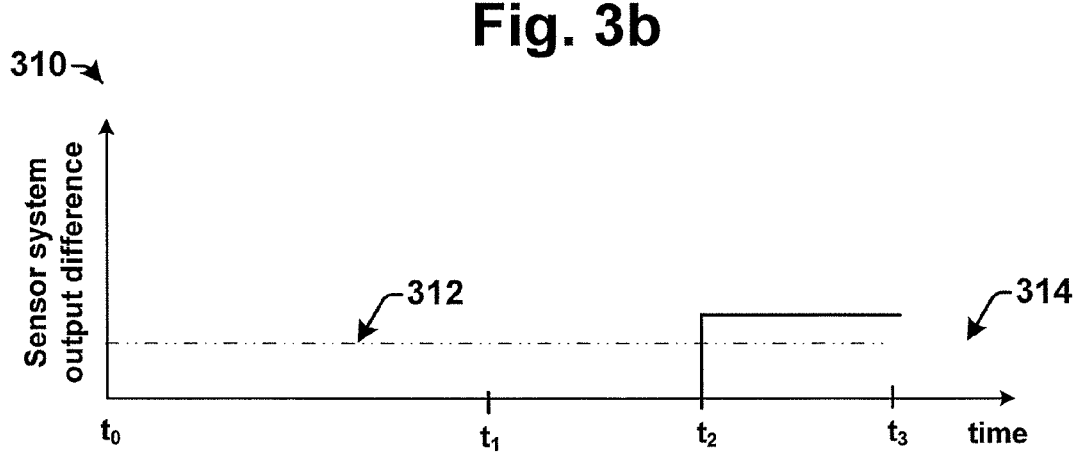

FIGS. 3a-3c illustrate graphs (300, 306, 310) showing operation of some embodiments of a disclosed tool monitoring system.

FIG. 3a illustrates a graph 300 showing a first monitoring response 302 output from a first sensor system (e.g., corresponding to sensor system 104 in FIG. 1). The graph 300 includes a vertical axis (y-axis) corresponding to an amplitude of the first monitoring response and a horizontal axis (x-axis) corresponds to time. The first monitoring response 302 tracks a processing condition of a manufacturing tool.

As shown in FIG. 3a, from time $t_0$ to time $t_2$ the first monitoring response 302 correctly corresponds to the actual processing condition of a manufacturing tool. However, at time $t_2$ the first monitoring response 302 undergoes a shift downwards. The shift corresponds to an error in the first sensor, such that the resulting monitoring response from time $t_2$ to time $t_3$ does not correctly correspond to the actual processing condition within the manufacturing tool.

When the first monitoring response 302 is provided to a comparator (e.g., corresponding to comparator 206a in FIG. 2), it is compared to a tool setting value 304 having a specific value. If the monitoring response 302 violates the tool setting value 304, an adjustment is made to the processing conditions of the manufacturing tool. The adjustment changes the first monitoring response 302 to a value that does not violate the tool setting value 304. For example, as shown in FIG. 3a, at time $t_1$ the first monitoring response 302 becomes greater than the tool setting value 304. In response, an adjustment is made to the processing conditions of the manufacturing tool that causes the first monitoring response 302 to drop to a value that is lower than the tool setting value 304.

FIG. 3b illustrates a graph 306 showing a concurrent, second monitoring response 308 output of a redundant, second sensor system (e.g., corresponding to sensor system 112 in FIG. 1). As shown in FIG. 3b, from time $t_0$ to time $t_2$ the second monitoring response 308 is equal to the first monitoring response 302. However, at time $t_2$, the second monitoring response 308 does not undergo a shift (i.e., the redundant, second sensor continues to operate properly). Therefore, from time $t_2$ to time $t_3$, the second monitoring response 308 correctly corresponds to the actual processing condition within the manufacturing tool.

A comparison element (e.g., corresponding to comparison element 114 in FIG. 1) is configured to compare the first monitoring response 302 and the second monitoring response 308. FIG. 3c illustrates a graph 310 showing a difference between the first monitoring response 302 and the second monitoring response 308. From time $t_0$ to time $t_2$ the first and second monitoring responses are equal and the difference therebetween is zero. However, at time $t_2$ the shift in the first monitoring response 302 causes a difference between the first and second monitoring responses to arise. If the difference is greater than a threshold value 312, a warning signal is generated indicating a problem with the first and/or second sensor systems. It will be appreciated that although the threshold value 312 is illustrated in FIG. 3c as a non-zero value that such a threshold value is a non-limiting example intended to aid the reader in understanding.

Figure 4:
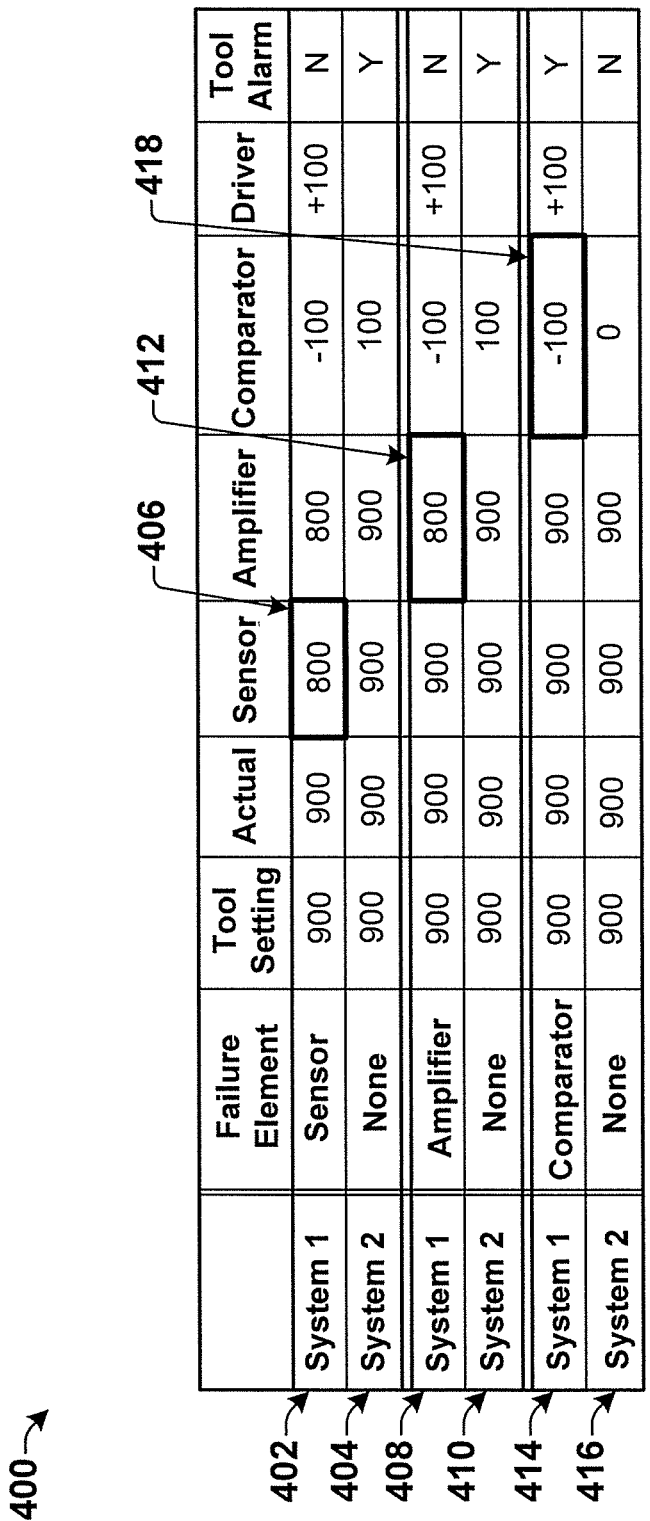
FIG. 4 is a table showing an exemplary operation of a semiconductor tool monitoring system disclosed herein to detect errors in different components of a sensor system.

The disclosed tool monitoring system is able to detect errors in different components of a sensor system. For example, FIG. 4 illustrates a table 400 showing an example of the operation of a disclosed tool monitoring system to detect errors in a failure element comprising a sensor, an amplifier, and a comparator of a sensor system. As illustrated in table 400, the first column of each failure element corresponds to a first sensor system and the second column corresponds to a redundant, second sensor system.

As shown in first column 402, the actual processing condition of a manufacturing tool comprises a bias voltage of 900 V. However, a shift 406 in the output of a first sensor causes the sensor to generate a first output signal having a value of 800 V. The first output signal is provided to a first amplifier, which amplifies the first output signal to generate a first monitoring response that is provided to a first comparator. The first comparator detects a difference of −100 V between the first monitoring response and a tool setting value. Therefore, the first comparator generates an adjustment call that causes a driver to increase the actual power of the manufacturing tool by 100 V, resulting in an actual power of 1000 V (so that sensor data reaches 900 V). Accordingly, as shown in first column 402, while there is an error in the operation of the first sensor system, it will not trigger a tool alarm.

As shown in second column 404, the redundant, second sensor system comprises a second sensor that correctly reads the actual processing condition of the manufacturing tool and generates a second output signal having a value of 900 V. The second output signal is provided to a second amplifier, which amplifies the second output signal to generate a second monitoring response that is provided to a second comparator. The second comparator detects a difference of 100 V between the first monitoring response and the second monitoring response. The difference between monitoring responses causes the second comparator to generate a tool alarm indicating that there is an error in the operation of a sensor in the first and/or second sensor systems.

Table 400 similarly illustrates how the disclosed tool monitoring system is able to detect an error 412 in an amplifier (illustrated in columns 408 and 410). In the amplifier example, a shift 412 in the first monitoring response output from a first amplifier causes the first amplifier to amplifier erroneously output a first monitoring response indicating a bias voltage value of 800 V. While the first comparator (column 408) does not trigger a tool alarm, the difference between monitoring responses causes the second comparator (column 410) to generate a tool alarm indicating that there is an error in the operation of a component of the first or second sensor systems.

Columns 414 and 416 illustrate an example of a shift 418 in the output signal of a first comparator (column 414). Since the output of the first comparator will impact elements within a closed control loop (e.g., PID controller 212 and driver 110), the sensor and amplifier within the first sensor system (column 414) will detect the shift 418 and trigger a tool alarm. Since the monitoring responses are both 900 V, the second sensor system does not trigger a tool alarm.

Figure 5:
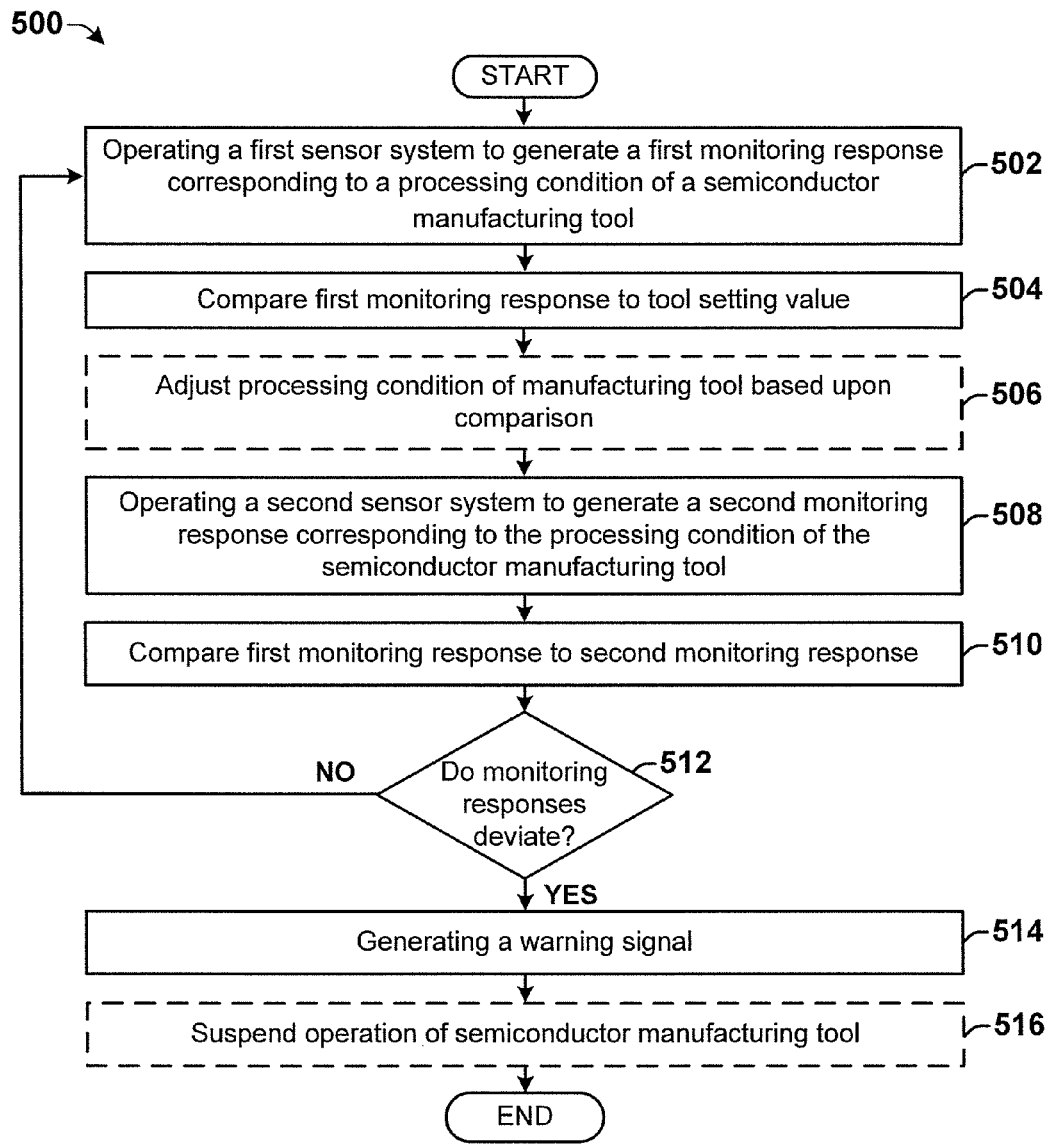
FIG. 5 is a flow diagram of some embodiments of a method for reliably monitoring processing conditions of a semiconductor manufacturing tool.

FIG. 5 is a flow diagram illustrating some embodiment of an exemplary method 500 for forming method for reliably monitoring processing conditions of a semiconductor manufacturing tool. While the method 500 provided herein is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 502 a first sensor system is operated to generate a first monitoring response corresponding to a processing condition of a semiconductor manufacturing tool. The first monitoring response may comprise a voltage value corresponding to a processing condition such as temperature, gas flow, etc.

At step 504 the first monitoring response is compared to a tool setting value. The tool setting value corresponds to an acceptable performance range of the semiconductor manufacturing tool. If the first monitoring response violates the tool setting value (e.g., is not within a range defined by the tool setting value), a processing condition of the semiconductor manufacturing tool is adjusted based upon the comparison, at step 506.

At step 508 a second sensor system is operated to generate a second monitoring response corresponding to the processing condition of a semiconductor manufacturing tool. The second monitoring response corresponds to the same processing condition of the same manufacturing tool as the first monitoring response.

At step 510 the first monitoring response is compared to the second monitoring response. If the first and second monitoring responses do not deviate from one another (step 512) the system continues to operate the first and second sensors to generate monitoring responses. If the first and second monitoring responses deviate from one another (step 512) a warning signal is generated (step 514).

For example, if the first and second monitoring responses deviate from one another by a value greater than a threshold value then a warning signal is generated. The threshold value may have a value of 0 in some embodiments, such that a warning signal is generated if the first and second monitoring responses are unequal. In some embodiments, the warning signal may be provided to a control system, which suspends operation of the manufacturing tool (step 516) upon receiving the warning signal.

It will be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to a semiconductor tool monitoring system having multiple sensors configured to concurrently and independently monitor processing conditions of a semiconductor manufacturing tool.

In some embodiments, the present disclosure relates to a semiconductor manufacturing tool monitoring system, comprising a first sensor system configured to measure one or more processing conditions of a semiconductor manufacturing tool and to generate a first monitoring response based thereupon, and a second sensor system configured to measure the one or more processing conditions of the semiconductor manufacturing tool and to generate a second monitoring response based thereupon. A comparison element is configured to compare the first monitoring response to the second monitoring response, wherein a deviation between the first and second monitoring responses is indicative of an error in the first or second sensor systems.

In other embodiments, the present disclosure relates to a semiconductor manufacturing tool, comprising a semiconductor manufacturing tool. A first sensor system is configured to measure a processing condition of the semiconductor manufacturing tool and to generate a first monitoring response based thereupon. The first sensor drives a closed control loop configured to adjust the one or more processing conditions of the semiconductor manufacturing tool. A second sensor system is configured to measure the processing condition of the semiconductor manufacturing tool and to generate a second monitoring responses based thereupon. A comparator is configured to compare the first and second monitoring responses and to generate a warning signal if the monitoring responses deviate from one another by an amount greater than a threshold value.

In other embodiments, the present disclosure relates to a method for reliably monitoring processing conditions of a semiconductor manufacturing tool. The method comprises operating a first sensor system to generate a first monitoring response corresponding to a processing condition of a manufacturing tool. The method further comprises operating a second sensor system to generate a second monitoring response corresponding to the processing condition of the manufacturing tool. The method further comprises comparing the first monitoring response to the second monitoring response to determine if an error is present in the first or second sensor systems.

What is claimed is:

1. A semiconductor manufacturing tool monitoring system, comprising:
   a first sensor system configured to measure one or more processing conditions of a semiconductor manufacturing tool and to generate a first monitoring response based thereupon;
   a second sensor system configured to measure the one or more processing conditions of the semiconductor manufacturing tool and to generate a second monitoring response based thereupon;
   a comparison element configured to compare the first monitoring response to the second monitoring response to identify a deviation between the first and second monitoring responses is indicative of an error in the first or second sensor systems;
   a control system configured to receive a warning signal from the comparison element and upon receiving the warning signal to suspend operation of the semiconductor manufacturing tool; and
   wherein the comparison element is configured to generate the warning signal if the first monitoring response deviates from the second monitoring response, which is measured at a substantially same time as the first monitoring response, by a value greater than a threshold value.

2. The monitoring system of claim 1, wherein the first sensor system comprises:

a first sensor configured to measure the one or more processing conditions of the semiconductor manufacturing tool;

a first amplifier configured to receive and amplify an output of the first sensor to generate the first monitoring response; and a first comparator configured to compare the first monitoring response to a tool setting value and to generate an adjustment call if the first monitoring response violates the tool setting value.

3. The monitoring system of claim 2, wherein the adjustment call is provided to a closed control loop configured to adjust the one or more processing conditions of the semiconductor manufacturing tool.

4. The monitoring system of claim 3, wherein the closed control loop comprises:

a PID controller configured to receive the adjustment call and to generate a control signal therefrom; and a driver configured to receive the control signal and based thereupon to make an adjustment to one or more manufacturing tool components of the semiconductor manufacturing tool that adjust the one or more processing conditions.

5. The monitoring system of claim 2, wherein the second sensor system comprises:

a second sensor configured to measure the one or more processing conditions of the semiconductor manufacturing tool concurrent with the first sensor;

a second amplifier configured to receive and amplify an output of the second sensor to generate the second monitoring response; and a second comparator configured to compare the first monitoring response to the second monitoring response and to generate the warning signal if the first and second monitoring responses deviate by an amount greater than the threshold value.

6. The monitoring system of claim 1, wherein the comparison element comprises a fault detection and classification (FDC) system configured to receive the first and second monitoring responses, to detect the deviation between the first and second monitoring responses, and to take action to prevent damage to a semiconductor body within the semiconductor manufacturing tool if the deviation is detected.

7. The monitoring system of claim 1, wherein the one or more processing conditions comprise one or more of a temperature and a gas flow rate.

8. The monitoring system of claim 1, wherein the first sensor system and the second sensor system comprise different types of sensors.

9. A semiconductor manufacturing tool, comprising:
a semiconductor manufacturing tool;
a first sensor system configured to measure one or more processing conditions of the semiconductor manufacturing tool and to generate a first monitoring response based thereupon, wherein the first sensor drives a closed control loop configured to adjust the one or more processing conditions of the semiconductor manufacturing tool;
a second sensor system configured to measure the one or more processing conditions of the semiconductor manufacturing tool at a substantially same time as the first sensor system and to generate a second monitoring response based thereupon; and
a comparator configured to compare the first and second monitoring responses, to generate a warning signal if the first and second monitoring responses deviate from one another by an amount greater than a threshold value, and upon receiving the warning signal to suspend operation of the semiconductor manufacturing tool.

10. The manufacturing tool of claim 9, wherein the first sensor system comprises:

a first sensor configured to measure the one or more processing conditions of the semiconductor manufacturing tool;

a first amplifier configured to receive and amplify an output of a first sensor to generate the first monitoring response; and a first comparator configured to compare the first monitoring response to a tool setting value and to generate an adjustment call if the first monitoring response violates the tool setting value, wherein the adjustment call is provided to the closed control loop configured to adjust the one or more processing conditions of the semiconductor manufacturing tool.

11. The manufacturing tool of claim 10, wherein the closed control loop comprises:

a PID controller configured to receive the adjustment call and to generate a control signal therefrom; and a driver configured to receive the control signal and based thereupon to make an adjustment to one or more manufacturing tool components of the semiconductor manufacturing tool that adjust the one or more processing conditions.

12. The manufacturing tool of claim 9, wherein the second sensor system comprises:

a second sensor configured to measure the one or more processing conditions of the semiconductor manufacturing tool concurrent with the first sensor; and a second amplifier configured to receive and amplify an output of the second sensor to generate the second monitoring response.

13. The manufacturing tool of claim 9, wherein the one or more processing conditions comprises a temperature or a gas flow rate.

14. A method for reliably monitoring processing conditions of a semiconductor manufacturing tool, comprising:

operating a first sensor system to generate a first monitoring response corresponding to one or more processing conditions of a manufacturing tool;

operating a second sensor system to generate a second monitoring response corresponding to the one or more processing conditions of the manufacturing tool;

comparing the first monitoring response to the second monitoring response to determine if an error is present in the first or second sensor systems;

comparing the first monitoring response to a tool setting value;

adjusting one or more processing conditions of the manufacturing tool if the first monitoring response violates the tool setting value; and generating a warning signal if the first monitoring response deviates from the second monitoring response, which is measured at a substantially same time as the first monitoring response, by more than a threshold value.

15. The method of claim 14, further comprising:
suspending operation of the semiconductor manufacturing tool if the warning signal is generated.

16. The method of claim 14, wherein the one or more processing conditions comprises a temperature or a gas flow rate.

* * * * *